March 28, 1967      C. C. MILLER      3,311,325
ROLL CORRECTOR BRAKE MECHANISM
Filed Feb. 1, 1966
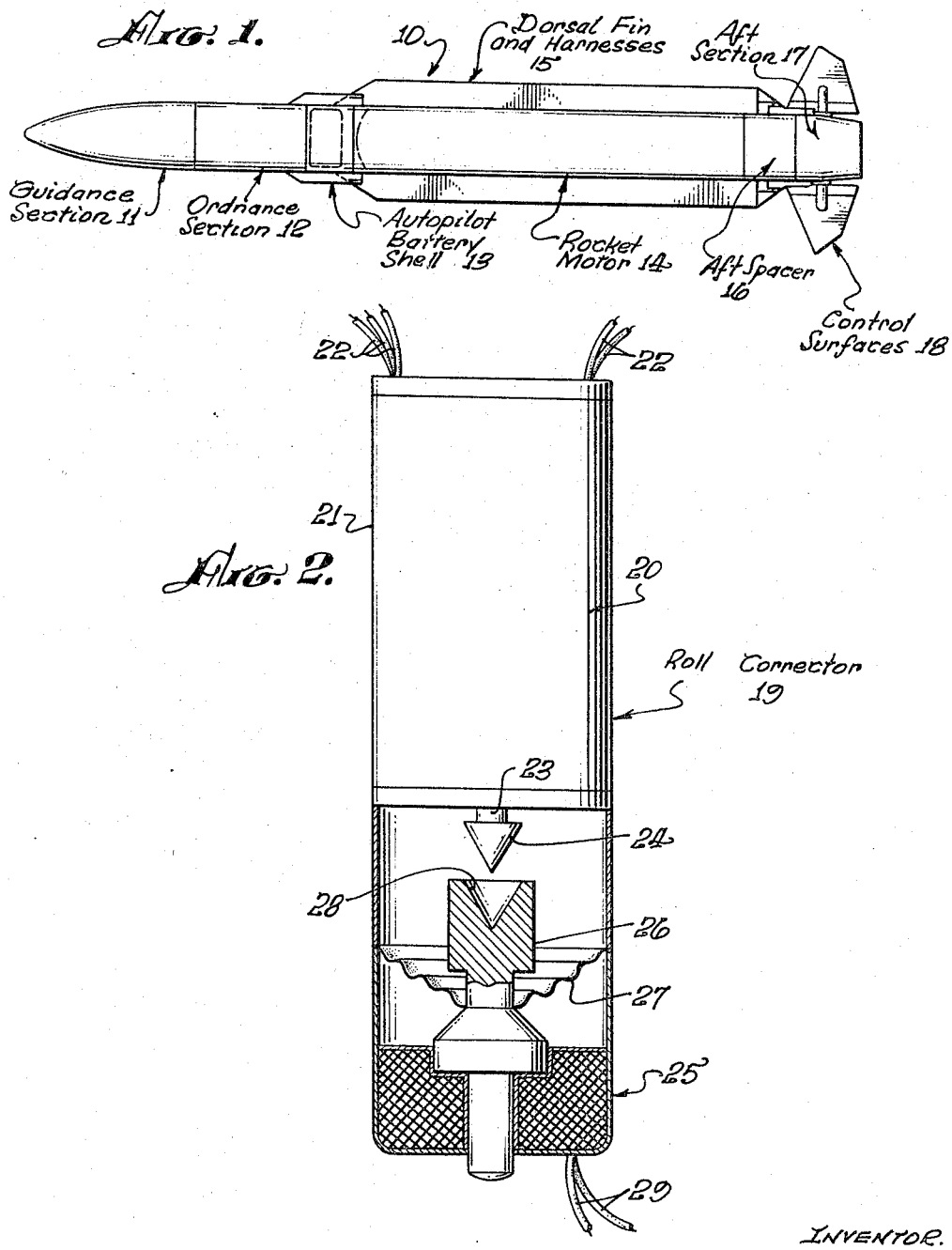

United States Patent Office 3,311,325
Patented Mar. 28, 1967

3,311,325
ROLL CORRECTOR BRAKE MECHANISM
Cyril C. Miller, Claremont, Calif., assignor to General Dynamics Corporation, a corporation of Delaware
Filed Feb. 1, 1966, Ser. No. 523,988
5 Claims. (Cl. 244—3.1)

This invention relates to brake mechanisms, particularly to a brake mechanism for releasing and locking a rotating shaft, and more particularly to a roll corrector brake mechanism for air vehicles such as missiles.

In launching a guided missile or similar air vehicle from a movable rolling platform; i.e., a moving vehicle over rough terrain or a ship moving in a rough sea, there is a need for a roll interpreting device. Such a device is usually designated as a roll corrector which is a type of memory device which produces an electric analogue of the launching platform's angular position as referenced to some predetermined state, such as the true horizon. This electrical analogue is transferred to the missile's computer at the instant of launch and remains during the duration of flight. The signal is useful in the overall operation of the missile guidance system and primarily for the operation of the missile's guidance control surfaces which direct the flight of the missile.

While there may be various types of roll correctors, this invention is directed to the electro-mechanical type which consists of two or more major components; a receiving cynchro and a braking device controlled by an electrical solenoid.

Therefore, it is an object of this invention to provide a reliable, inexpensive and accurate braking mechanism for releasing and locking a shaft at a precise time and a precise position.

A further object of the invention is to provide a roll corrector device adapted for controlling the flight of an air vehicle.

Another object of the invention is to provide a braking mechanism in combination with a synchro rotor of a roll corrector device.

Another object of the invention is to provide a roll corrector braking mechanism which is controlled by an electrical solenoid.

Other objects of the invention, not specifically set forth above, will become readily apparent from the following description and accompanying drawings wherein:

FIG. 1 is a schematic side elevation view of an air vehicle incorporating the invention; and FIG. 2 is a view of an embodiment of the roll corrector device with the braking mechanism thereof shown in cross section.

Broadly, the invention is directed to a roll corrector unit comprising a synchro receiver and a braking mechanism for releasing and locking the rotor shaft of the receiver. The braking mechanism is of the spring set, electromagnetically released type and comprises a solenoid and a solenoid plunger mounted to a diaphragm element. The end of the rotor shaft and the end of the solenoid plunger are provided with mating conical portions, and the solenoid plunger is spring loaded by the diaphragm element, such that the mating portions are held in abutting relation to brake the rotating shaft. When the solenoid is energized, the plunger end is drawn away from the shaft end so that the shaft can rotate freely.

Referring now to the drawings, FIG. 1 shows an air vehicle or missile 10 which generally consists of a guidance section 11, an ordnance section 12, an autopilot and battery section 13, rocket motor 14, dorsal fins 15, an aft spacer 16, an aft section 17, and control surfaces 18.

Positioned within the guidance section 11 of missile 10 is the electronics and associated equipment for controlling the control surfaces 18 and other missiles components. The roll corrector device of this invention is located within guidance section 11 and functions as described hereinafter.

As shown in FIG. 2, the roll corrector, generally indicated at 19 is composed of a synchro receiver generally indicated at 20 and supported within an upper portion of a suitable housing 21, by conventional means, and a brake mechanism located in the lower portion of housing 21. Since the synchro receiver 20 may be constructed in known manner and the details do not constitute part of this invention, a description thereof is deemed unnecessary except to point out that the receiver 20 is electrically connected via leads 22 to other components within the guidance section 11 of missile 10, for a purpose which will become more apparent hereinafter, and is provided with a rotor shaft 23 terminating in a conically configured end 24.

The brake mechanism of roll corrector 19 is of the spring set, electromagnetically released type, and comprises an electrical solenoid 25 and a solenoid plunger 26 connected to housing 21 via a resilient diaphragm element 27. The end of solenoid plunger 26 is provided with a conical concavity 28 adapted for mating cooperation with the conical end 24 of shaft 23. The solenoid is connected via leads 29 to a power source not shown. Thus when the solenoid 25 is not actuated the mating conical portions 24 and 28 are held in spring loaded abutting relation to brake the rotor shaft 23 of synchro receiver 20 by the action of diaphragm element 27. When the solenoid 25 is energized, the plunger 26 is drawn away so that the concavity 28 is separated from the conical shaft end 24 such that the shaft 23 can rotate freely. The diaphragm element 27 provides linear movement of braking plunger 26 while at the same time restricting the radial movement of the plunger, thereby greatly increasing the capability of the braking mechanism in stopping and locking the rotor shaft 23 at a precise moment or degree of rotation.

In operation, the receiver synchro 20 receives power via leads 22 from the launcher (not shown) and angular position information from the above mentioned stable element in the transporting vehicle (not shown). Previous to the launching of missile 10, the brake solenoid 25 is energized via leads 29 allowing the receiving synchro 20 to move in exact sequence with the launcher stable element. At the moment of launch, three things happen: (1) the primary power for the receiving synchro 20 is transferred from the launcher to the missile power system (section 13); (2) power is removed from the brake solenoid 25, thereby effectively locking the receiver synchro rotor shaft 23 in a fixed position; and (3) the synchro rotor's fixed position now produces an electrical analogue of the missile's angular position at the moment of launch. This signal is fed into the missile's computer located in guidance section 11 for correction of the missile's flight path via operation of the control surfaces 18.

It is thus seen that the roll corrector of this invention provides a simple yet effective method of producing the needed information so that a proper flight path of a missile or other air vehicle can be obtained.

The concavity 28 and the mating conical shaft end 24 are in metal to metal contact with one another, thus providing greater life than other types of mating surfaces. In addition, heat from the solenoid will not affect the function of the locking configuration of this invention since it does not incorporate surfaces which are subject to drying out or out gassing.

While the mating locking surfaces have been illustrated and described as being of a conical configuration, other tapered configurations may be effectively utilized. The advantage of such a tapered configuration of the locking members is that they provide a more positive and non-slip action than other configurations.

Although a particular embodiment of the invention has been illustrated and described, modification will become apparent to those skilled in the art, and it is intended to cover in the appended claims all such modifications as come within the true spirit and scope of the invention.

What is claimed is:

1. A roll corrector adapted for controlling the launch and flight path of an air vehicle comprising: a housing; a receiving synchro and a brake mechanism operatively located with respect to said housing; said receiving synchro including means adapted for electrically connecting said synchro receiver with associated components, and a rotatable shaft member, said shaft member being provided with a tapered end portion; said brake mechanism including an electric solenoid, said solenoid including leads adapted to be connected to a power source, a plunger member, said plunger member being movable in alignment with said shaft member, said plunger member being provided with a tapered concavity configured so as to cooperate with said tapered end portion of said synchro receiver shaft member, and a resilient diaphragm means operatively connected to said solenoid plunger member and to said housing; whereby said shaft member of said synchro receiver is allowed to rotate freely and is locked by said solenoid plunger member when said solenoid selectively receives suitable signals due to the cooperation between said tapered end portion of said shaft member and said tapered concavity in said plunger member caused by the tension of said diaphragm means.

2. The roll corrector defined in claim 1, wherein said tapered end portion of said synchro rotor shaft member is of a conical configuration, and said concavity in said solenoid plunger member is of a conical configuration.

3. The roll corrector defined in claim 1, wherein said resilient diaphragm means is so constructed and connected to said solenoid plunger member and to said housing so as to allow said plunger member to freely move longitudinally while preventing radial movement of said plunger member.

4. The roll corrector defined in claim 1, wherein said plunger member is moved away from said tapered end portion of said shaft member when said solenoid is energized by said signals allowing said shaft member to rotate freely, and is moved in abutment with said tapered end portion of said shaft member when said solenoid is deenergized by said signals locking said shaft member at a desired point of rotation.

5. The roll corrector defined in claim 1 in combination with an air vehicle, said air vehicle including at least a guidance section and a plurality of control surfaces, said roll corrector functioning to produce signals which are utilized by said guidance section for controlling the launch and flight path of said air vehicle via said control surfaces.

References Cited by the Examiner

UNITED STATES PATENTS

| | | | |
|---|---|---|---|
| 434,147 | 8/1890 | Hunter | 192—2 X |
| 1,579,455 | 4/1926 | Remde | 192—2 |
| 2,681,717 | 6/1954 | Spurgeon | 192—2 |
| 3,098,411 | 7/1963 | Fry | 89—1.812 |

BENJAMIN A. BORCHELT, *Primary Examiner.*

W. C. ROCH, *Assistant Examiner.*